(12) United States Patent
Johnson

(10) Patent No.: US 7,377,712 B1
(45) Date of Patent: May 27, 2008

(54) SWIVEL ASSEMBLY

(75) Inventor: Julian E. Johnson, Springboro, OH (US)

(73) Assignee: Precision Industries, Inc., Springboro, OH (US)

( * ) Notice: Subject to any disclaimer, the term of this patent is extended or adjusted under 35 U.S.C. 154(b) by 40 days.

(21) Appl. No.: 11/116,135

(22) Filed: Apr. 27, 2005

(51) Int. Cl.
*F16M 11/06* (2006.01)
*F16M 11/04* (2006.01)

(52) U.S. Cl. .................. 403/78; 403/165; 403/344; 403/360

(58) Field of Classification Search .............. 403/61, 403/78, 360, 344, 164, 165, 408.1; 248/585
See application file for complete search history.

(56) References Cited

U.S. PATENT DOCUMENTS

| | | | |
|---|---|---|---|
| 3,466,073 A * | 9/1969 | Pohle | 403/326 |
| 4,447,031 A | 5/1984 | Souder, Jr. et al. | |
| 4,473,024 A * | 9/1984 | Armstrong | 403/344 |
| 4,475,755 A * | 10/1984 | Patton | |
| 4,669,907 A * | 6/1987 | Patton | 403/344 |
| 4,708,382 A * | 11/1987 | LaCount | 403/78 |
| 5,393,162 A * | 2/1995 | Nissen | 403/79 |
| 5,505,424 A * | 4/1996 | Niemann | |
| 6,055,798 A * | 5/2000 | Fulmer et al. | 403/344 |
| 6,824,471 B2 * | 11/2004 | Kamenov | 403/344 |
| 6,953,212 B2 * | 10/2005 | Alba | 403/78 |
| 6,997,420 B2 * | 2/2006 | Yudis et al. | 248/89 |
| 7,000,905 B1 * | 2/2006 | Lutter et al. | 403/344 |

* cited by examiner

*Primary Examiner*—David Bagnell
*Assistant Examiner*—Ernesto Garcia
(74) *Attorney, Agent, or Firm*—Roger S. Dybvig

(57) ABSTRACT

A swivel assembly for connecting a load such as a television receiver to a support includes a swivel stem having a cylindrical head, a reduced diameter cylindrical middle body, and a mounting base. The stem is supported by a retainer assembly including thrust washers engaging the top and the bottom of head. An adjustment is provided for maintaining the thrust washers securely engaged with the head of the stem.

15 Claims, 2 Drawing Sheets

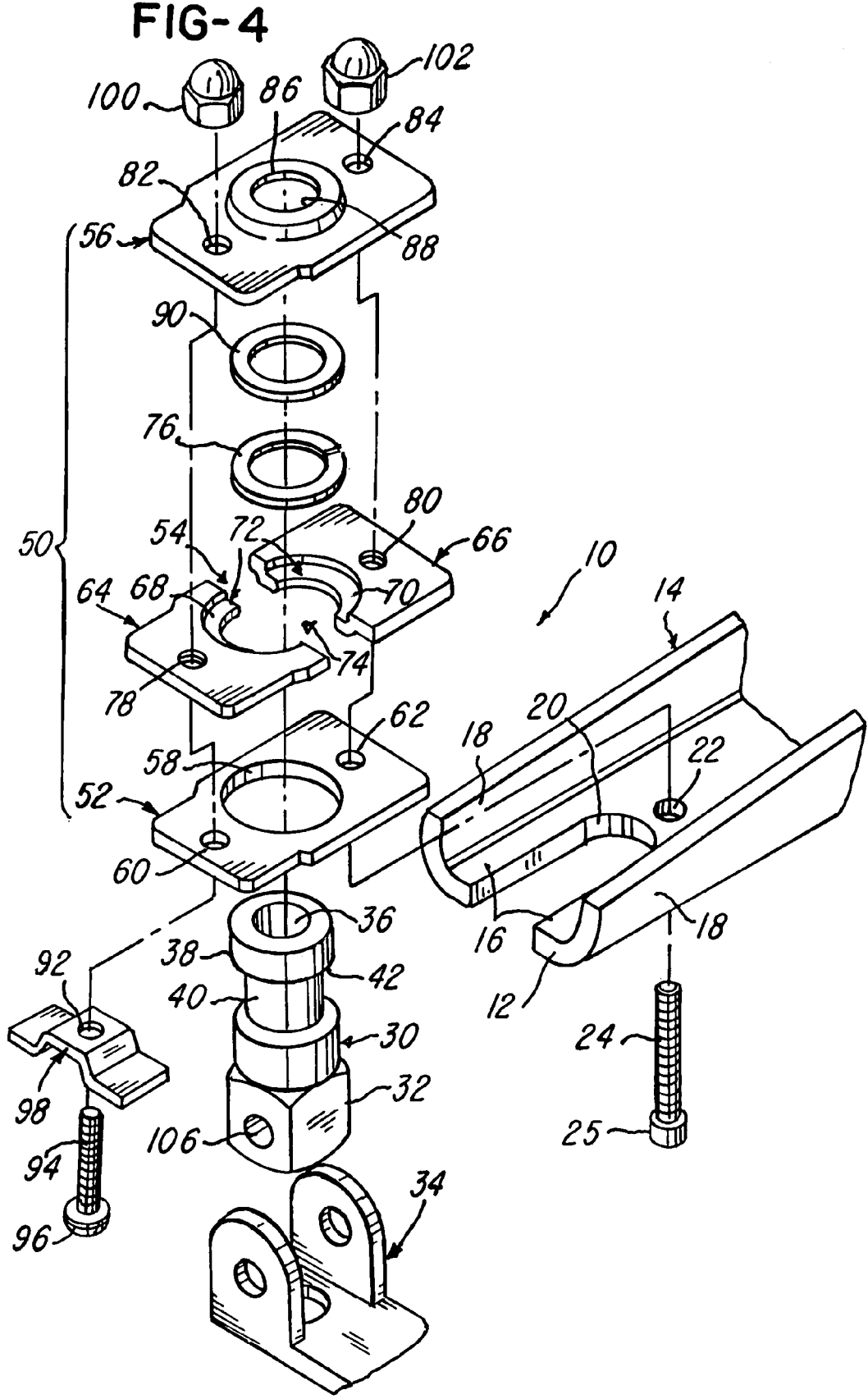

SWIVEL ASSEMBLY

FIELD OF THE INVENTION

This invention relates to a swivel assembly used to attach a load, such as a television receiver, to a support member in a manner to permit the load to rotate.

BACKGROUND OF THE INVENTION

One use of a swivel assembly of the type contemplated by this invention is to rotatably support a television receiver on a support arm adjacent a hospital bed. Such swivel assemblies may be hollow to permit electrical cables to extend along the center axis of the swivel assembly from the television receiver. Swivel assemblies are known in the art, but these are typically difficult to assemble at a hospital or other site and have an undesirable looseness, leading to a backlash condition which permits the load to wobble. Therefore, there is need for an improved swivel assembly that provides a swivel joint for rotatably supporting a television receiver or other load with minimal or no looseness or backlash.

SUMMARY OF THE INVENTION

A swivel assembly for connecting a load such as a television receiver includes a swivel stem having a cylindrical head, a reduced diameter cylindrical middle body, and a mounting base. The stem is supported by a retainer assembly including a pair of thrust washers engaging respectively the top of said head and the bottom of the head. An adjustment is provided for maintaining the thrust washers securely engaged with the head of the stem at a tension which enables the swivel stem to be rotated about a fixed axis and to avoid a backlash condition that would enable the load to wobble.

Other aspects and advantages of this invention will become apparent from the following description and the drawings.

BRIEF DESCRIPTION OF THE DRAWINGS

FIG. 4 is an exploded perspective view of the swivel support assembly, the support arm, and a clevis shown in phantom associated with a television receiver (not shown). Only a fragment of the support arm is illustrated.

DETAILED DESCRIPTION

Figure 1:
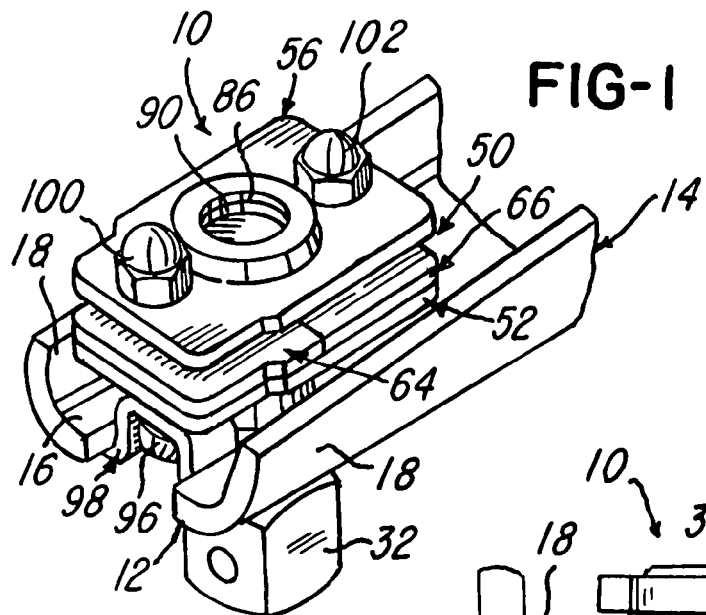
FIG. 1 is an isometric view of a swivel support assembly in accordance with this invention mounted on a support arm for a television receiver. Only a fragment of the support arm is illustrated.
Figure 2:
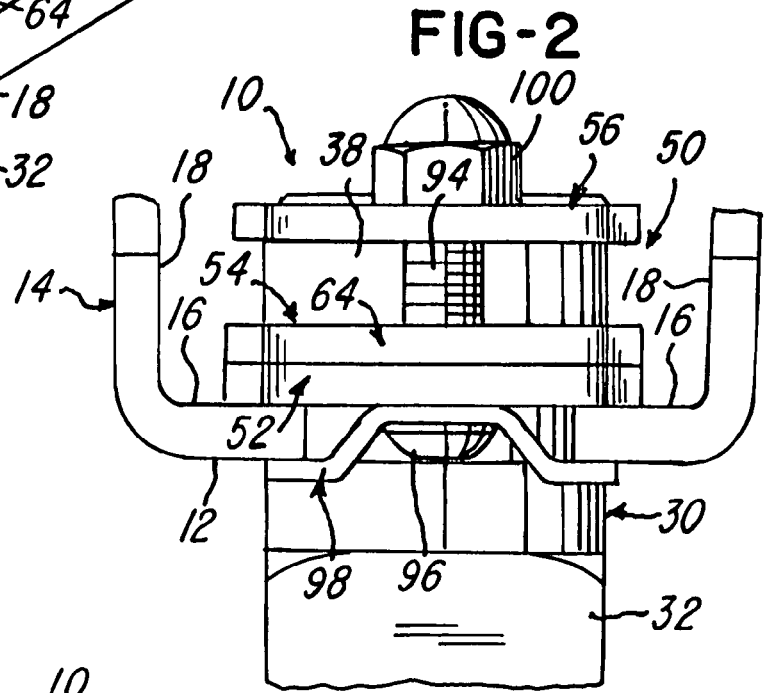
FIG. 2 is an end elevational view of the swivel support assembly and the support arm of FIG. 1. Only a fragment of the support arm is illustrated.
Figure 3:
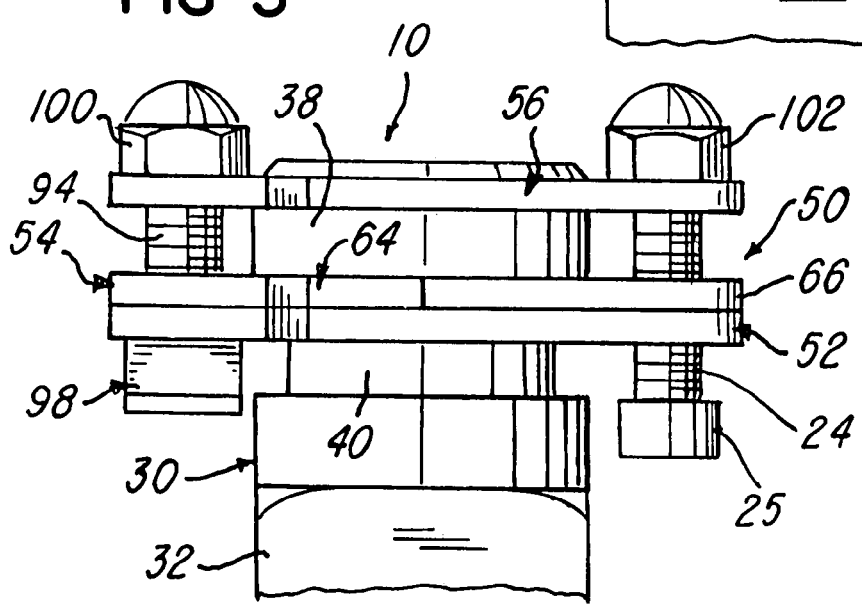
FIG. 3 is side elevational view of the swivel support assembly of FIG. 1, omitting the support arm to avoid a confusion of lines.

With reference to the drawings, a swivel assembly, generally designated 10 is shown in FIGS. 1 through 3 mounted on and supported by the nose 12 of television support arm 14. As shown best in FIG. 4, the support arm nose 12 is generally U-shaped, having a flat bottom wall 16 and flat side walls 18. The support end of the nose 12 includes a U-shaped mounting slot 20 centrally of the bottom wall 16 and a through bore 22 spaced from the mounting slot 20 for a rear threaded fastener member 24, which may be a cap screw.

As also shown best in FIG. 4, a one-piece swivel stem 30 having a rectangular mounting base 32 is designed to be connected by a clevis pin (not shown) to a clevis attachment assembly 34, shown in phantom, mounted on the top of a television receiver (not shown), or any other load.

In addition to the mounting base 32, the swivel stem 30 has a cylindrical head 38 and a reduced diameter cylindrical middle body 40. The mounting base 32, the head 38, and the middle body 40 are mutually coaxial, and the head 38 has a ring-shaped bottom surface 42 forming an outwardly-extending shoulder at the top of the middle body 40. Here it may be noted that the swivel stem 30, made hollow by the through bore 36, may be essentially identical to other swivel stems used in the past for supporting television receivers on support arms.

In accordance with this invention, the swivel stem 30 is rotatably supported on the support arm nose 12 by a retainer assembly, generally designated 50, comprising a bottom retainer plate 52, a lower washer support or plate assembly, generally designated 54, and a top retainer plate 56.

The bottom retainer plate 52 has a circular aperture 58 of sufficiently large diameter that the head 38 of the swivel stem 30 can be extended therethrough, a front circular bore 60, and a rear circular bore 62.

A front retainer plate 64 and a rear retainer plate 66 constitute the lower washer support assembly 54. The front and rear retainer plates 64 and 66 are abutted end-to-end to one another and have semicircular recesses 68 and 70, respectively, that form a circular, upwardly-facing, ring-shaped washer nest 72 around a circular aperture 74. A split, lower thrust washer 76 is supported within the washer nest 72. Both the nest 72 and the lower thrust washer 76 have an inner diameter only slightly larger than the outer diameter of the middle portion 40 of the stem 30. Accordingly, when the retainer assembly 50 is fully assembled, the bottom surface 42 of the stem head 38 will be engaged and supported by the lower thrust washer 76.

The lower thrust washer 76, which may be nylon, is too small to pass over the head 38 or the mounting base 32 of the swivel stem 30. Accordingly, during assembly of the retainer assembly 50, the lower thrust washer 76, since it is split, can be bent or otherwise deformed as needed to encircle the middle stem body 40. Thereafter, the front and rear retainer plates 64 and 66 may conveniently be inserted between the lower thrust washer 76 and the bottom retainer plate 52.

Front retainer plate 64 has a threaded front bore 78 aligned with the front bore 60 of the bottom retainer plate 52 and the rear retainer plate 66 has a threaded rear bore 80 aligned with the rear bore 62 of the bottom retainer plate 52.

The top retainer plate 56 overlies the swivel stem head 38 and has a centrally-located bore 86 surrounded by an upwardly-extending, downwardly-facing washer pocket 88 overlying the swivel stem head 38 which receives a second, upper, thrust washer 90, which may also be made from nylon. The lower surface of the upper washer 90 is engaged with the top surface of the stem head 38. Thus, it will be appreciated that the stem head 38 is sandwiched between upper and lower thrust washers 90 and 76, which are lodged within washer nests or pockets.

Top retainer plate 56 also has a front bore 82 and a rear bore 84. These are respectively vertically aligned with the front bores 78 and 60 in the front retainer plate 64 and the bottom plate 52 and the rear bores 80 and 62 in the rear retainer plate 66 and the bottom plate 52.

A front threaded fastener 94, which may also be a cap screw, extends upwardly through the aligned front bores 60, 78 and 82, and has a head 96 engaged with the bottom surface of a retainer clip 98 that extends upwardly through the mounting slot 20 and bears upwardly against the bottom retainer plate 52, and also bears upwardly against lower surface portions of the bottom wall 16 along margins of the mounting slot 20. The retainer clip 98 has a central bore 92 aligned with the front bores 60, 78 and 82 through which the front threaded fastener 94 also extends. The mid-portion of the front threaded fastener 94 is threadedly connected to the front plate 64 due to the threaded connection with the threaded front bore 78 therein. The aforementioned rear threaded fastener 24 has a head 25 that bears upwardly against the bottom wall 16 of the support arm 14 and the fastener 24 extends vertically through the aligned rear bores 62, 80 and 84 as well as the aligned support arm bore 22, and is threaded to the rear plate 66 by virtue of its engagement with the threads of the rear bore 80 in the rear plate 66. The heads 25 and 96 of the respective threaded fasteners 24 and 94 may comprise Allen heads having internal, axial hexagonal sockets (not shown) at their lower ends for engagement by an Allen wrench (not shown).

As is evident from the foregoing description and the drawings, the swivel assembly 10 is clamped to the bottom support wall 16 of the support arm 14 in part by the retainer clip 98 in association with the front threaded fastener 94 and in part by the head 25 of the rear cap screw 24 which engages the bottom surface of the support wall 16.

A front adjusting nut 100 threaded onto the upper end of the front threaded fastener 94 bears downwardly against the top surface of the upper retainer plate 56. The front threaded fastener 94 may have a button head 96 to provide clearance for the swivel stem 30 and any parts (not shown) supported thereby. Similarly, a rear adjusting nut 102 threaded onto the upper end of the rear threaded fastener 94 also bears downwardly against the top surface of the upper retainer plate 56. The adjusting nuts 100 and 102 may be acorn nuts as illustrated in the drawings to cover the upper ends of the threaded fasteners 24 and 94.

When the swivel assembly 10 is first installed on the support arm 14, the threaded fasteners 24 and 94 are rotated so as to draw the rear and front plates 64 and 66, respectively, tightly against the bottom plate 52 so that the bottom plate 52 lies flush against the bottom wall 18 of the support arm 14. This creates a rigid connection between the support arm 14, the front and rear plates 64 and 66, and the bottom plate 52.

To pre-load or pre-tension the swivel assembly 10, the acorn nuts 100 and 102 are rotated to bear downwardly on the top plate 56 to a finger tightness, whereupon the swivel stem head 38 is trapped between the two nylon washers 76 and 90. The foregoing assembly can be carried out in a factory or on site at a hospital or other location. Thereafter, when a load such as a television set is connected to the swivel stem base 32, the acorn nuts 100 and 102 can be tightened to the extent that the swivel stem 30 is rotatable without looseness or backlash.

After extended use, the swivel assembly 10 could become loose and exhibit a backlash. This can easily be eliminated by the simple expedient of rotating the acorn nuts 100 and 102 to bear further downwardly on the top plate 52, and thereby reestablish the desired degree of tightness between the swivel stem head 38 and the washers 76 and 90.

Although the threaded fasteners 24 and 94 are illustrated as comprising Allen head cap screws and used with acorn nuts 100 and 102, it will be evident that other threaded fasteners, such as threaded rods, screws or bolts (not shown), with appropriate heads and/or nuts (not shown) may be used instead to achieve the purposes of this invention. In practice, ¼ 20 socket head cap screws have been used, but fasteners having other sizes and thread fineness could be used.

The parts of the swivel assembly 10 may be made from metal. The stem may be made from aluminum and the retainer plates from cold rolled steel, but other materials may be used.

Electrical cables (not shown) from a television receiver can be extended upwardly through the central bore 36 in the swivel stem 30, around the clevis pin (not shown) received in the transverse bore 106 in the base 32 of the swivel stem 30 and outwardly through the central bore 86 in the top retainer plate 56, and then along the support arm 14.

Although the presently preferred embodiment of this invention has been described, it will be understood that within the purview of the invention various changes may be made within the scope of the following claims.

Having thus described my invention, I claim:

1. A swivel assembly for connecting a load to a support member, said swivel assembly comprising:
   a one-piece hollow swivel stem having a head, a reduced size middle body, and a mounting base, said head, body, and base being mutually coaxial, and said head having a bottom surface forming an outwardly-extending shoulder at the top of said middle body; and
   a retainer assembly for rotatably supporting said head of said swivel stem, said retainer assembly comprising:
   a bottom retainer plate;
   a washer plate assembly comprising front and rear retainer plates abutted against one another and forming between them a bore surrounding said middle body of said swivel member and also forming a washer nest;
   a lower thrust washer supported in said nest and engaged with said shoulder;
   a top retainer plate overlying said head, said top retainer plate having a downwardly-open washer pocket overlying said head;
   an upper thrust washer located in said pocket and engaged with a top surface of said head;
   said top retainer plate, said front retainer plate, and said bottom retainer plate having mutually aligned front through bores, said front through bore in said front retainer plate being threaded;
   a front threaded fastener extending through said front bores and threadedly engaged with said threaded bore in said front retainer plate;
   said top retainer plate, said rear retainer plate, and said bottom retainer plate having mutually aligned rear through bores, said rear through bore in said rear retainer plate being threaded;
   a rear threaded fastener extending through said rear bores and threadedly engaged with said threaded rear bore in said rear retainer plate;
   said washer plate assembly being clamped to said bottom retainer plate in part by said threaded fasteners; and
   adjusting members threadedly engaged with said threaded fasteners and bearing downwardly on said top retainer plate.

2. The swivel assembly of claim 1 wherein said swivel stem has a through bore, and said top retainer plate has a through bore aligned with said through bore in said swivel stem, so that a cable associated with said load can pass through said swivel stem.

3. The swivel assembly of claim 2 wherein said swivel assembly further comprises a retainer clip used to clamp said swivel assembly to said support member.

4. The swivel assembly of claim 1 wherein said adjusting members comprise adjusting nuts threaded to said threaded fasteners.

5. The swivel assembly of claim 4 wherein said adjusting members comprise acorn nuts.

6. The swivel assembly of claim 1 wherein said threaded fasteners comprise cap screws.

7. The swivel assembly of claim 6 wherein said adjusting members comprise adjusting nuts threaded to said cap screws.

8. The swivel assembly of claim 7 wherein said adjusting nuts comprise acorn nuts.

9. The swivel assembly of claim 1 wherein said thrust washers are nylon washers.

10. The swivel assembly of claim 1 wherein said lower thrust washer is a split washer.

11. The swivel assembly of claim 10 wherein said thrust washers are nylon washers.

12. The swivel assembly of claim 1 wherein the bore of said lower thrust washer is too small to pass over said head or said mounting base and said lower thrust washer is a split washer.

13. The swivel assembly of claim 12 wherein said thrust washers are nylon washers.

14. A swivel assembly in combination with a support arm, said support arm having a support wall, a mounting slot at an end of said support wall, and a through bore spaced from said mounting slot, said swivel assembly comprising:

a one-piece hollow swivel stem having a head, a reduced size middle body, and a mounting base, said head, body, and base being mutually coaxial, and said head having a bottom surface forming an outwardly-extending shoulder at the top of said middle body; and a retainer assembly for rotatably supporting said head of said swivel stem, said retainer assembly comprising:

a bottom retainer plate;

a washer plate assembly comprising front and rear retainer plates abutted against one another and forming between them a bore surrounding said middle body of said swivel member and also forming a washer nest;

a lower thrust washer supported in said nest and engaged with said shoulder;

a top retainer plate overlying said head, said top retainer plate having a downwardly-open washer pocket overlying said head;

an upper thrust washer located in said pocket and engaged with a top surface of said head;

said top retainer plate, said front retainer plate, and said bottom retainer plate having mutually aligned front through bores, said front through bore in said front retainer plate being threaded;

a front threaded fastener extending through said front bores and threadedly engaged with said threaded bore in said front retainer plate, said front threaded fastener having a head;

said top retainer plate, said rear retainer plate, and said bottom retainer plate having mutually aligned rear through bores, said rear through bore in said rear retainer plate being threaded;

a rear threaded fastener extending through said rear bores and threadedly engaged with said threaded rear bore in said rear retainer plate, said rear threaded fastener having a head;

said washer plate assembly being clamped to said bottom retainer plate in part by said threaded fasteners; and adjusting members threadedly engaged with said threaded fasteners and bearing downwardly on said top retainer plate; wherein said swivel assembly is clamped in part to said support wall by a retaining clip extending through said mounting slot and engaged with said bottom retainer plate and with said support wall along lower margins of said mounting slot, said retaining clip having a through bore through which said front threaded fastener extends and which is engaged from beneath by the head of said front threaded fastener; and wherein said swivel assembly is clamped in part by the head of said rear threaded fastener which engages the bottom surface of said support wall.

15. The swivel assembly of claim 14 wherein said threaded fasteners comprise cap screws.

\* \* \* \* \*